(12) United States Patent
McGinn

(10) Patent No.: US 9,191,265 B1
(45) Date of Patent: Nov. 17, 2015

(54) INTERNET MULTIMEDIA SUBSYSTEM (IMS) BYPASS OF A LONG TERM EVOLUTION (LTE) POLICY, CHARGING, AND RULES FUNCTION (PCRF)

(71) Applicant: Sprint Communications Company L.P., Overland Park, KS (US)

(72) Inventor: Ryan J. McGinn, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 97 days.

(21) Appl. No.: 14/175,612

(22) Filed: Feb. 7, 2014

(51) Int. Cl.
*H04L 29/06* (2006.01)
*H04L 12/24* (2006.01)
*H04W 24/02* (2009.01)

(52) U.S. Cl.
CPC ...... *H04L 29/06217* (2013.01); *H04L 41/0654* (2013.01); *H04L 65/1016* (2013.01); *H04W 24/02* (2013.01)

(58) Field of Classification Search
None
See application file for complete search history.

(56) References Cited

U.S. PATENT DOCUMENTS

| 8,315,589 | B2 | 11/2012 | Li et al. | |
|---|---|---|---|---|
| 2008/0175157 | A1* | 7/2008 | Lim et al. | 370/242 |
| 2010/0250680 | A1* | 9/2010 | Bhatt et al. | 709/206 |
| 2011/0302289 | A1* | 12/2011 | Shaikh et al. | 709/223 |
| 2012/0140665 | A1* | 6/2012 | Li et al. | 370/252 |
| 2014/0301258 | A1* | 10/2014 | Belghou | 370/311 |
| 2015/0055446 | A1* | 2/2015 | Avula et al. | 370/216 |

* cited by examiner

*Primary Examiner* — Christine Duong

(57) ABSTRACT

A communication system controls a Long Term Evolution (LTE) media session with an Internet Multimedia Subsystem (IMS). An LTE Packet Gateway (P-GW) establishes an IMS bearer between User Equipment (UE) and an IMS server. The IMS server receives a media session request over the IMS bearer and processes the media session request to establish the media session including transferring a media session instruction for delivery to an LTE Policy, Charging, and Rules Function (PCRF) system. The IMS server detects a PCRF bypass condition for the media session, and in response, transfers a UE session instruction for delivery to the UE to use the IMS bearer for the media session. The UE and IMS server exchange media data for the media session over the IMS bearer through the LTE P-GW.

20 Claims, 10 Drawing Sheets

INTERNET MULTIMEDIA SUBSYSTEM (IMS) BYPASS OF A LONG TERM EVOLUTION (LTE) POLICY, CHARGING, AND RULES FUNCTION (PCRF)

TECHNICAL BACKGROUND

Long Term Evolution (LTE) communication systems supply User Equipment (UE) with wireless access to communication services, such as Internet access and Voice over LTE (VoLTE) calling. The LTE systems include Packet Gateways (P-GWs) that interface with external systems, such as the Internet and an Internet Multimedia Subsystem (IMS). The LTE systems also include Policy, Charging, and Rules Functions (PCRFs) to control Quality-of-Service (QoS) and bandwidth allocations at the P-GWs. The P-GWs and PCRFs interact to establish media bearers between UEs and P-GWs. The P-GWs and PCRFs also interact to establish IMS bearers between UEs and IMS servers.

To place a VoLTE call, a UE exchanges Session Initiation Protocol (SIP) messages with an IMS Proxy Call Session Control Function (P-CSCF) over its IMS bearer. In response, the IMS CSCF systems exchange SIP messages with other systems to establish the voice session. If the voice session is accepted, the P-CSCF instructs the LTE PCRF to add a voice bearer for the VoLTE call. In response, the LTE PCRF supplements the voice bearer instruction with QoS and bandwidth allocation data and forwards the supplemented voice bearer instruction to the LTE P-GW. The LTE P-GW then establishes the voice bearer, and the P-CSCF transfers a SIP message to the UE over the IMS bearer to use the voice bearer for the VoLTE call. The UE then exchanges voice packets with the LTE P-GW over the voice bearer, and the P-GW exchanges the voice packets with the other systems to extend the voice path for the call.

A key aspect of this VoLTE process is the IMS P-CSCF instruction to the LTE PCRF to add the voice bearer for the call. The LTE PCRF supplements the voice bearer instruction with QoS and bandwidth data, and transfers the supplemented voice bearer instruction to the LTE P-GW. If the LTE PCRF is not available due to an outage, then the P-CSCF may provide an alarm or notice, but the media session may not occur. Current techniques to handle PCRF outages on VoLTE sessions are not efficient and effective.

TECHNICAL OVERVIEW

A communication system controls a Long Term Evolution (LTE) media session with an Internet Multimedia Subsystem (IMS). An LTE Packet Gateway (P-GW) establishes an IMS bearer between User Equipment (UE) and an IMS server. The IMS server receives a media session request over the IMS bearer and processes the media session request to establish the media session including transferring a media session instruction for delivery to an LTE Policy, Charging, and Rules Function (PCRF). The IMS server detects a PCRF bypass condition for the media session, and in response, transfers a UE session instruction for delivery to the UE to use the IMS bearer for the media session. The UE and IMS server exchange media data for the media session over the IMS bearer through the LTE P-GW.

DETAILED DESCRIPTION

Figure 1:
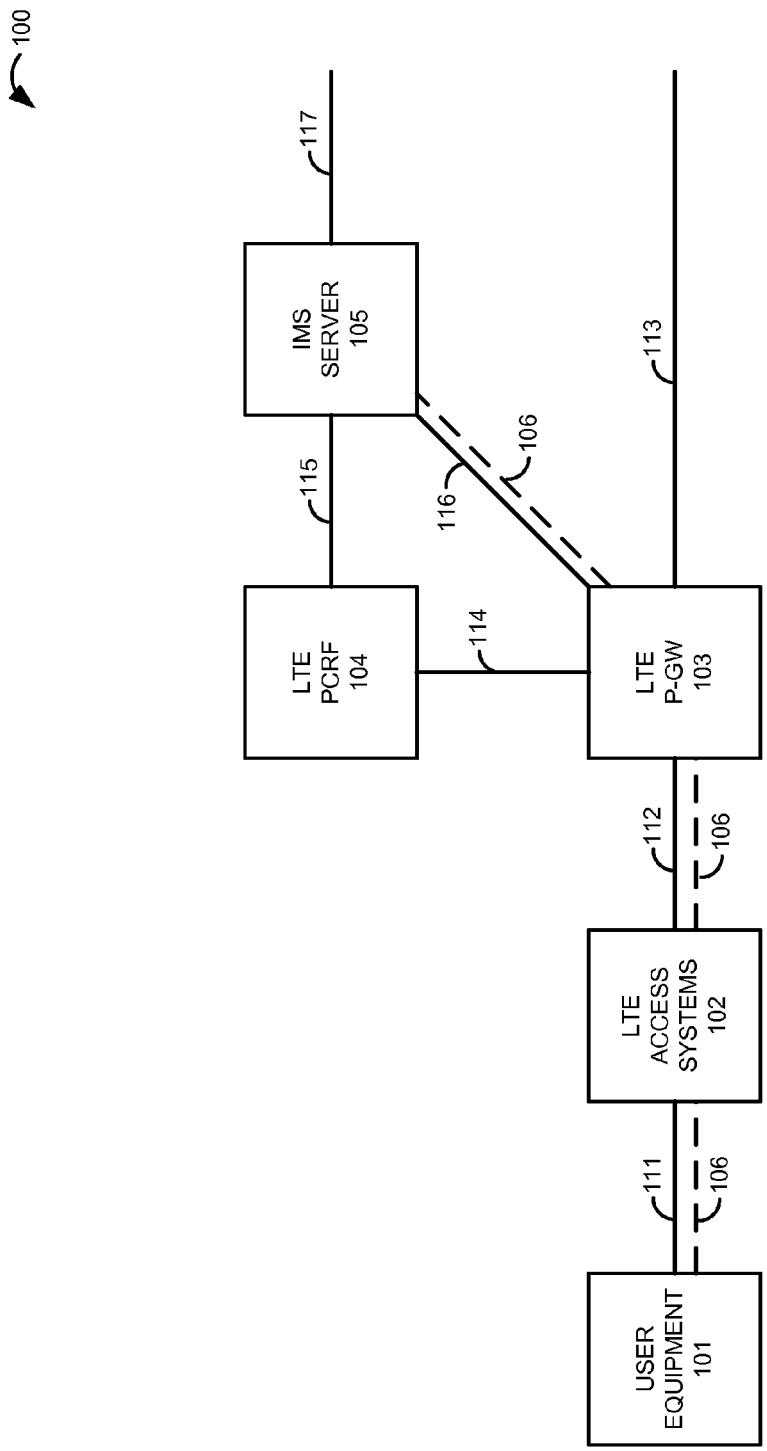
FIG. 1 illustrates a communication system to control a Long Term Evolution (LTE) media session with an Internet Multimedia Subsystem (IMS) server.

FIG. 1 illustrates communication system 100 to control a Long Term Evolution (LTE) media session with Internet Multimedia Subsystem (IMS) server 105. Communication system 100 comprises User Equipment (UE) 101, LTE access systems 102, LTE Packet Data Network Gateway (P-GW) 103, LTE Policy, Charging, and Rules Function (PCRF) system 104, and IMS server 105. UE 101 and LTE access systems 102 communicate over link 111. LTE access systems 102 and LTE P-GW 103 communicate over link 112. LTE P-GW 103 communicates with various systems over links 113. LTE P-GW 103 and LTE PCRF system 104 communicate over link 114. LTE PCRF system 104 and IMS server 105 communicate over link 115. LTE P-GW 103 and IMS server 105 communicate over link 116. IMS server 105 communicates with various systems over links 117.

UE 101 and IMS server 105 communicate over IMS bearer 106 that traverses LTE access systems 102, LTE P-GW 103, and links 111, 112, and 116. UE 101 could be a telephone, computer, media player, gaming apparatus, internet appliance, or some other machine capable of interfacing with LTE and IMS systems. UE 101 comprises computer and communication circuitry, data memory, and associated software/hardware components.

LTE access systems 102 typically include eNodeB base stations, Mobility Management Entities (MMEs), Serving Gateways (S-GWs), a Home Subscriber System (HSS), and the like. LTE access systems 102 may also include non-LTE access points that use LTE gateways. The non-LTE access points comprise Wireless Fidelity (WiFi) hotspots, legacy cellular base stations, internet access points, and the like. The LTE gateways provide interface systems between the non-LTE access points and the LTE systems, such as P-GW 103. Thus, UE 101 may access LTE P-GW 103 over a non-LTE access point and still operate as described herein to obtain IMS control over PCRF bypass.

LTE access systems 102, LTE P-GW 103, LTE PCRF system 104, and IMS server 105 comprise computer and communication circuitry, data storage equipment, and associated software/hardware components. Links 111-117 comprise metal, glass, plastic, air, space, and the like. Links 111-117 propagate electromagnetic signals that utilize various protocols, such as LTE, Internet Protocol (IP), Ethernet, Session Initiation Protocol (SIP), Diameter, Real-time Transfer Protocol (RTP), and/or some other format—including combinations thereof. Links 111-117 may include intermediate devices, systems, and networks.

IMS bearer 106 comprises a signaling link, such as a SIP link, between UE 101 and IMS server 105. IMS bearer 106 is established between UE 101 and IMS server 105 by UE 101, LTE access systems 102, P-GW 103, and PCRF 104. In some cases, IMS bearer 106 is a default bearer that was established during LTE registration for UE 101. In other cases, IMS bearer 106 is a dedicated bearer that was established when LTE access systems 102 activate an IMS Application Point Name (APN) for UE 101.

In operation, UE 101 transfers a media session request over IMS bearer 106 to IMS server 105. The media session could be a voice session, messaging session, audio session, video session, or some other type of IMS-controlled data session. IMS server 105 receives the media session request over IMS bearer 106. IMS server 105 processes the media session request to establish the media session. This typically includes exchanging signaling with other systems over links 117. If these other systems accept the media session, then IMS server 105 transfers a media session instruction to LTE PCRF system 104.

Under normal conditions, PCRF system 104 would process the media session instruction from IMS server 105 to instruct P-GW 103 to establish the media session. PCRF system 104 usually adds Quality-of-Service (QoS) and bandwidth allocation information to the instruction to P-GW 103. Under different conditions, PCRF system 104 does not acknowledge receipt of the media session instruction from IMS server 105. IMS server 105 eventually times-out awaiting the acknowledgement and determines to bypass PCRF system 104. Other conditions and factors may be used for the bypass determination. For example, PCRF 104 may return a bypass request signal to IMS server 105 or a network control system may supply a PCRF bypass signal to IMS server 105.

To effect PCRF bypass, IMS server 105 transfers a UE session instruction to UE 101 over IMS bearer 106. The UE session instruction directs UE 101 to use IMS bearer 106 for the media session. In response, UE 101 and IMS server 105 exchange media data, such as voice information or a text message, over IMS bearer 106. In some examples, IMS server 105 comprises a Proxy Call Session Control Function (P-CSCF).

In some examples, the media session request comprises a Voice over LTE (VoLTE) session. The PCRF bypass condition may then comprise a failed PCRF acknowledgement to IMS on a VoLTE session. In these VoLTE examples, IMS server 105 may exchange the media data between IMS bearer 106 and other systems over links 117. Thus, IMS server 105 might couple a voice path from UE 101 to a voice path to another user over links 117.

In some examples, the media session request comprises a messaging session. The PCRF bypass condition might comprise a failed PCRF acknowledgement to IMS on a messaging session. In these messaging examples, IMS server 105 may exchange the media data between IMS bearer 106 and a messaging server over links 117—and the messaging server would exchange the messages with other users. Thus, IMS server 105 might exchange text messages between UE 101 and a text messaging server over links 117.

In some examples, the media session request comprises an emergency request, such as a 911 VoLTE call. The PCRF bypass condition might comprise a failed PCRF acknowledgement to IMS on an emergency media session. In these emergency examples, IMS server 105 may exchange media data between IMS bearer 106 and an emergency communication link within links 117. Thus, IMS server 105 might couple a voice path from UE 101 to a voice path to a Public Safety Answering Point (PSAP).

Figure 2:
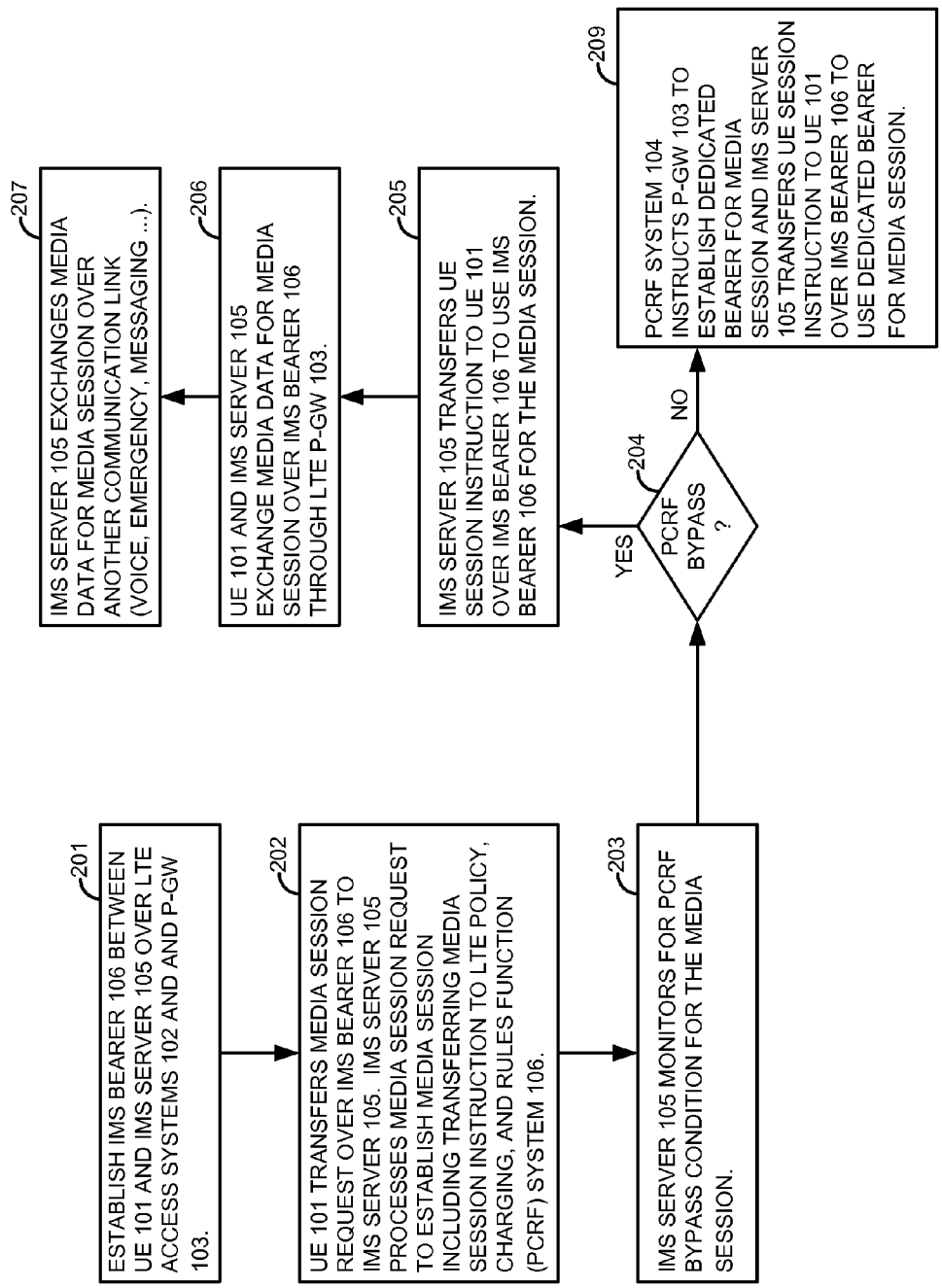
FIG. 2 illustrates the operation of a communication system to control an LTE media session with an IMS server.

FIG. 2 illustrates the operation of communication system 100 to control an LTE media session with IMS server 105. IMS bearer 106 is established between UE 101 and IMS server 105 (201). IMS bearer 106 may be a default bearer that is established during LTE registration or a dedicated bearer that is established to provide UE-IMS signaling connectivity. UE 101 transfers a media session request over IMS bearer 106 to IMS server 105 (202). The message could be a SIP message and the media session could be a voice session, messaging session, audio session, video session, or some other type of IMS-controlled data session. IMS server 105 processes the media session request to establish the media session (202) through the exchange of signaling with other systems and the transfer of a media session instruction to LTE PCRF system 104.

IMS server 105 monitors system status for a PCRF bypass condition (203). For example, PCRF system 104 may not respond to the media session instruction from IMS server 105. In other examples, PCRF 104 may return a bypass signal to IMS server 105 or a network control system may supply the bypass signal to IMS server 105. Other PCRF bypass conditions could be defined and used based on various factors such as: PCRF load, IMS load, Diameter metrics, media session type, access network type (like non-LTE access or roaming), UE type, UE QoS, and the like.

If a PCRF bypass condition is detected (204), then IMS server 105 transfers a UE session instruction to UE 101 over IMS bearer 106 (205). The UE session instruction directs UE 101 to use IMS bearer 106 for the media session. UE 101 and IMS server 105 then exchange media data over IMS bearer 106 through P-GW 103 (206). For example, UE 101 and IMS server 105 may exchange voice data for an emergency Voice over LTE (VoLTE) session over IMS bearer 106.

IMS server 105 exchanges the media data between IMS bearer 106 and links 117 to provide connectivity between UE 101 and other systems (207). For example, IMS server 105 may connect UE 101 with a Public Safety Answering Point (PSAP), voice server, messaging server, image server, or another UE. In some cases, IMS server 105 could cross-connect two or more IMS bearers to operationally couple two or more UEs.

If a PCRF bypass condition is not detected (204), then PCRF 104 transfers a media session instruction to P-GW 103 to implement the dedicated bearer, and IMS server 105 transfers a UE session instruction to UE 101 over IMS bearer 106 (209). The UE session instruction directs UE 101 to use the dedicated bearer for the media session. UE 101 and P-GW-103 then exchange media data over the dedicated bearer.

Figure 3:
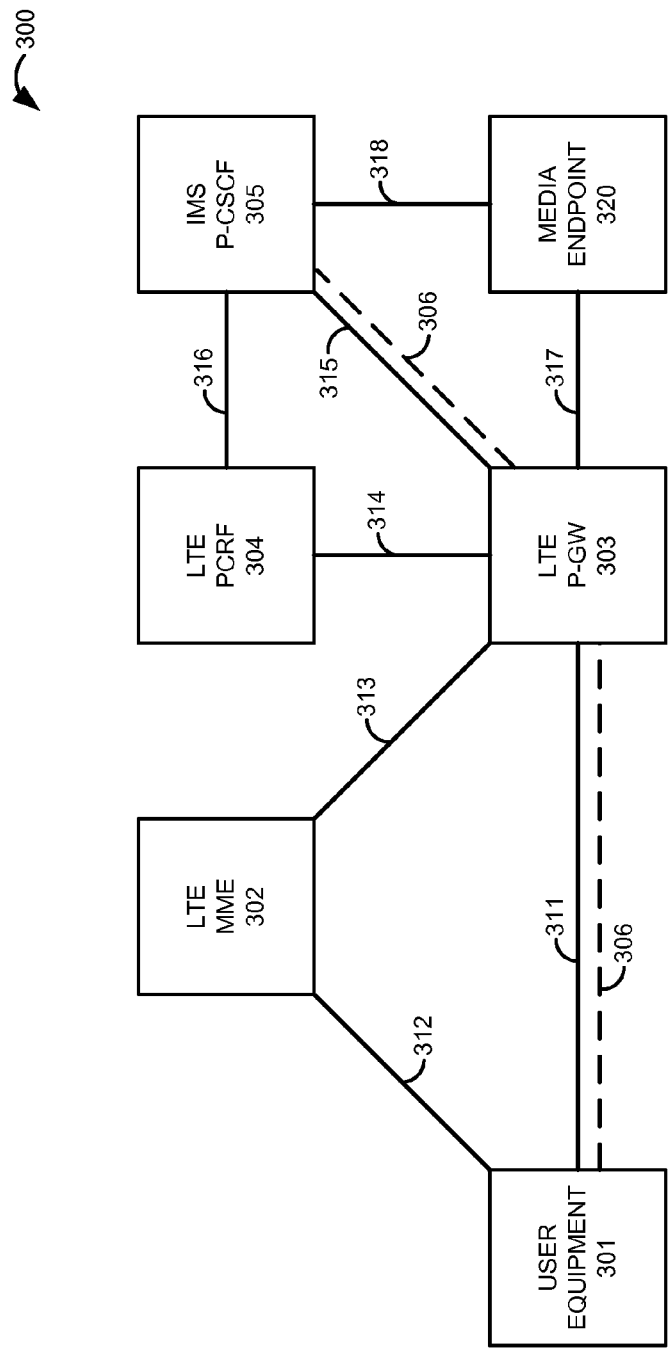
FIG. 3 illustrates a communication system to control an LTE media session with an IMS Proxy Call Session Control Function (P-CSCF) server.

FIG. 3 illustrates communication system 300 to control an LTE media session with IMS Proxy Call Session Control Function (P-CSCF) server 305. Communication system 300 comprises UE 301, LTE Mobility Management Entity (MME) 302, LTE P-GW 303, LTE PCRF 304, and IMS P-CSCF 305. UE 301 and P-GW 303 communicate over LTE link 311. UE 301 and MME 302 communicate over LTE link 312. MME 302 and P-GW 303 communicate over LTE link 313. P-GW 303 and PCRF 304 communicate over LTE link 314. For clarity, some network elements that comprise LTE links 311-314 are omitted, although these network elements would typically include eNodeBs, WiFi hot spots, 2G/3G base stations, LTE access gateways, serving gateways, routers, subscriber databases, and the like.

P-GW 303 and IMS server 305 communicate over IP link 315. PCRF 304 and P-CSCF 305 communicate over Diameter link 316. P-GW 303 and media endpoint 320 communicate over IP link 317. P-CSCF 305 and media endpoint 320 communicate over IP link 318. For clarity, the various network elements that comprise links 315-318 are omitted, although these network elements would typically include IMS servers, IP routers, soft-switches, packet gateways, bases stations, and the like.

UE 301 and P-CSCF 305 communicate over IMS bearer 306 that traverses link 311, P-GW 303, and link 315. IMS bearer 306 comprises a Session Initiation Protocol (SIP) link between UE 301 and P-CSCF 305. IMS bearer 306 may be established as a default bearer or a dedicated bearer as desired.

UE 301 transfers a SIP INVITE message for media endpoint 320 to P-CSCF 305. The INVITE could be for a VoLTE session, emergency session, video session, or some other type of IMS-controlled media session. P-CSCF 305 processes the INVITE to exchanging SIP signaling with media endpoint 320, and media endpoint 320 returns a SIP message accepting the media session. In response to the session acceptance, P-CSCF 305 transfers a Diameter instruction to PCRF 304 to establish a dedicated bearer for the media session.

Under normal conditions, PCRF 304 would process the Diameter instruction from P-CSCF 305 to instruct P-GW 303 to establish the dedicated bearer for the media session. PCRF system 304 usually adds Quality-of-Service (QoS) and bandwidth allocation information to the bearer instruction to P-GW 303. In this situation however, PCRF system 304 does not acknowledge receipt of the Diameter instruction from P-CSCF 305. P-CSCF 305 times-out awaiting the acknowledgement and determines to bypass PCRF 304. Other conditions and factors may be used for the bypass determination. For example, PCRF 304 may return a bypass request signal to P-CSCF 305 or a network control system may supply the bypass signal to P-CSCF 305.

To effect PCRF bypass, P-CSCF 305 transfers a SIP message to UE 301 over IMS bearer 306. The SIP message could be a SIP ACK to the original INVITE from UE 301. The SIP message directs UE 301 to use IMS bearer 306 for the media session. In response, UE 301 and P-CSCF 305 exchange media data, such as voice packets, over IMS bearer 306. P-CSCF 305 and media endpoint 320 exchange the media data over IP link 318. Thus, P-CSCF 305 connects IMS bearer 306 to IP link 318.

Figure 4:
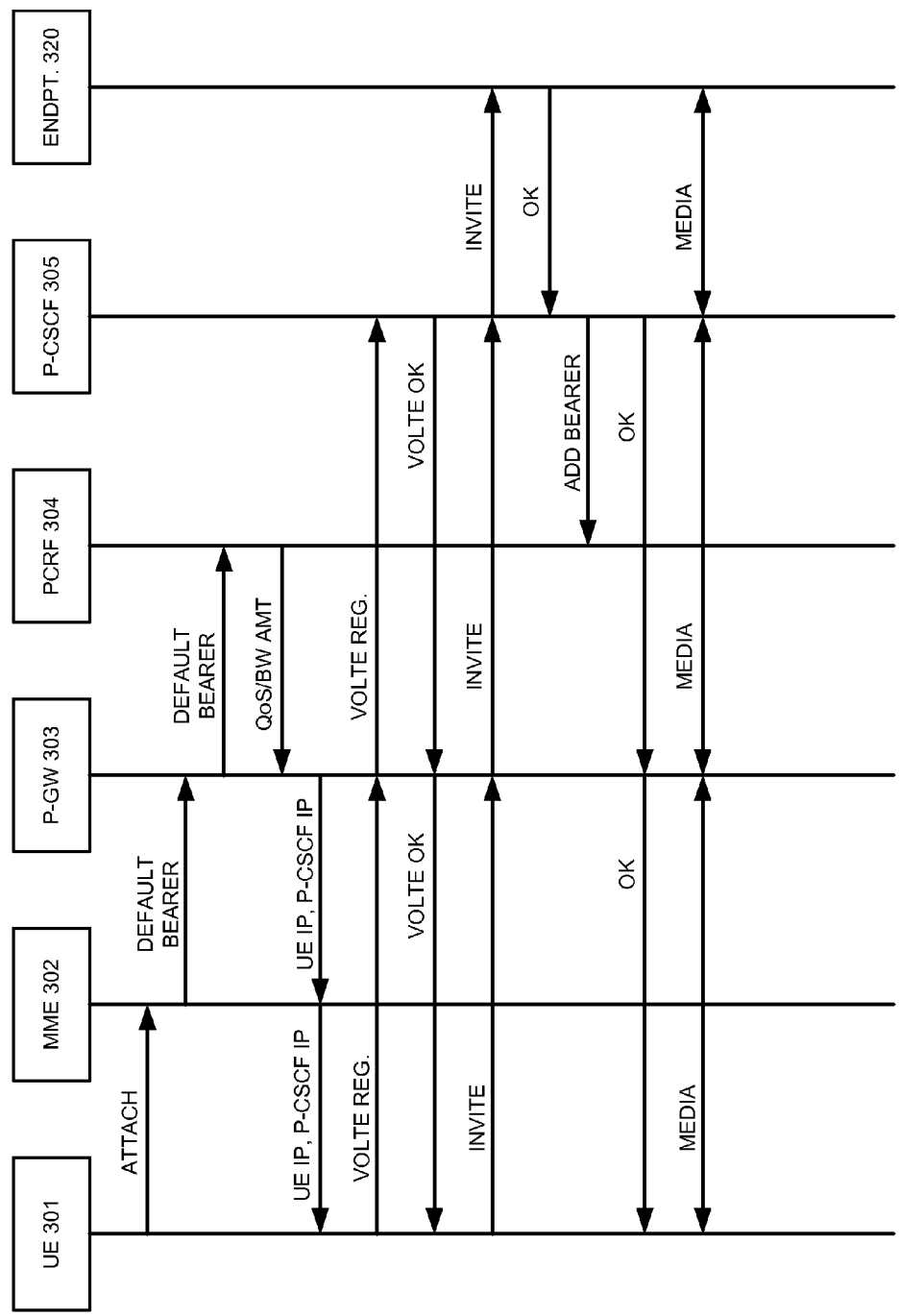
FIG. 4 illustrates the operation of a communication system to control an LTE media session with an IMS P-CSCF server.

FIG. 4 illustrates the operation of communication system 300 to control an LTE media session with IMS P-CSCF 305. UE 301 transfers an attach request to MME 302 after connecting to MME 302 through an eNodeB or some alternative LTE system access. MME 302 processes the attach request, along with a Home Subscriber System (HSS), to request a default bearer from P-GW 303. For example, the HSS may store an IMS APN that initiates the default bearer for UE 301.

P-GW 303 engages in a Diameter session with PCRF 304 to establish the default bearer. PCRF 304 returns QoS and bandwidth amount data to P-GW 303 to use in its role as a policy and charging enforcement point for the media session. P-GW 303 returns bearer information to UE 301 through MME 302, including an IP address for UE 301 and an IP address for P-CSCF 305. UE 301 transfers a VoLTE registration in a SIP message to P-CSCF 305 through P-GW 303. P-CSCF 305 performs VoLTE registration for UE 301 and returns a registration acknowledgement to UE 301 through P-GW 303.

Post-registration, UE 301 transfers a SIP INVITE through P-GW 303 to P-CSCF 305 for a voice session with media endpoint 320. P-CSCF 305 processes the INVITE to transfer a corresponding SIP INVITE to media endpoint 320—typically through intermediate SIP systems. Media endpoint 320 accepts the media session with a SIP OK response to P-CSCF 305. In response to the session acceptance, P-CSCF 305 transfers a Diameter instruction to PCRF 304 to add a dedicated bearer for the media session.

In this example, PCRF system 304 does not acknowledge receipt of the Diameter instruction, and P-CSCF 305 times-out waiting for the acknowledgement. As a result, P-CSCF 305 determines to bypass PCRF 304 and transfers a SIP OK message to UE 301 over IMS bearer 306 through P-GW 303. The SIP OK message is in response to the original INVITE from UE 301. The SIP OK message directs UE 301 to use IMS bearer 306 for the media session.

In response, UE 301 transfers voice packets for the session in an IP wrapper that uses IMS bearer 306 through P-GW 303 to P-CSCF 305. Thus, UE 301 might address the voice packets to media endpoint 320 and then encapsulate the voice packets in IP packets addressed to P-CSCF 305. P-CSCF 305 de-capsulates the voice packets and exchanges them with media endpoint 320 over link 318 (typically through other IMS components).

Figure 5:
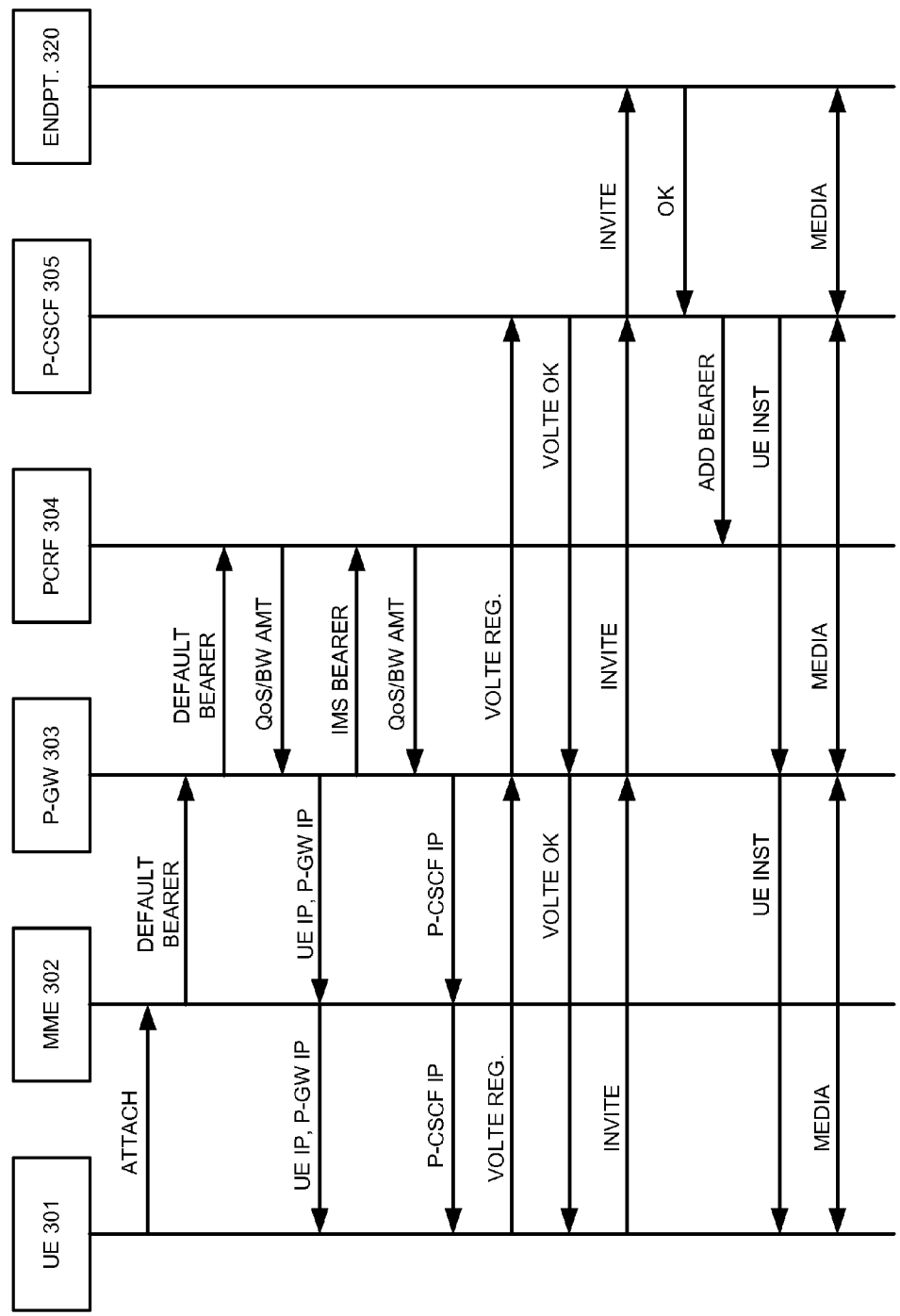
FIG. 5 illustrates the operation of a communication system to control an LTE media session with an IMS P-CSCF server.

FIG. 5 illustrates the operation of communication system 300 to control an LTE media session with IMS P-CSCF 305. UE 301 transfers an attach request to MME 302 after connecting to MME 302 through an eNodeB or some alternative LTE access. MME 302 processes the attach request, along with a Home Subscriber System (HSS), to request a default bearers from P-GW 303. For example, the HSS may store an internet-access APN to initiate the first default bearer for UE 301 and an IMS APN to initiate a subsequent default bearer.

P-GW 303 engages in a Diameter session with PCRF 304 to establish the first default bearer, and PCRF 304 returns QoS and bandwidth amount data to P-GW 303. P-GW 303 returns bearer information to UE 301 through MME 302, including an IP address for UE 301 and an IP address for P-GW 303. This first default bearer is used by UE 301 for internet access. Once the initial default bearer for internet access is established, P-GW 303 engages in another Diameter session with PCRF 304 to establish IMS bearer 306, and PCRF 304 returns QoS and bandwidth allocation data to P-GW 303. P-GW 303 returns IMS bearer information to UE 301 through MME 302, including an IP address for P-CSCF 305. UE 301 transfers a VoLTE registration to P-CSCF 305 over IMS bearer 306 through P-GW 303. P-CSCF 305 performs VoLTE registration for UE 301 and returns a registration acknowledgment to UE 301 through P-GW 303.

Post-registration, UE 301 transfers a SIP INVITE through P-GW 303 to P-CSCF 305 for a voice session with media endpoint 320. P-CSCF 305 processes the INVITE to transfer a corresponding SIP INVITE to media endpoint 320—typically through intermediate SIP systems. Media endpoint 320 accepts the media session with a SIP OK response to P-CSCF 305. In response to the session acceptance, P-CSCF 305 transfers a Diameter instruction to PCRF 304 to add a dedicated bearer for the media session.

In this example, PCRF system 304 does not acknowledge receipt of the Diameter instruction, and P-CSCF 305 times-out waiting for the acknowledgement. As a result, P-CSCF 305 determines to bypass PCRF 304 and transfers a SIP OK message to UE 301 over IMS bearer 306 through P-GW 303. The SIP OK message is in response to the original INVITE from UE 301. The SIP OK message directs UE 301 to use IMS bearer 306 for the media session.

In response, UE 301 transfers voice packets for the session in an IP wrapper that uses IMS bearer 306 through P-GW 303 to P-CSCF 305. P-CSCF 305 de-capsulates the voice packets and exchanges them with media endpoint 320 over link 318 (typically through other IMS components).

Figure 6:
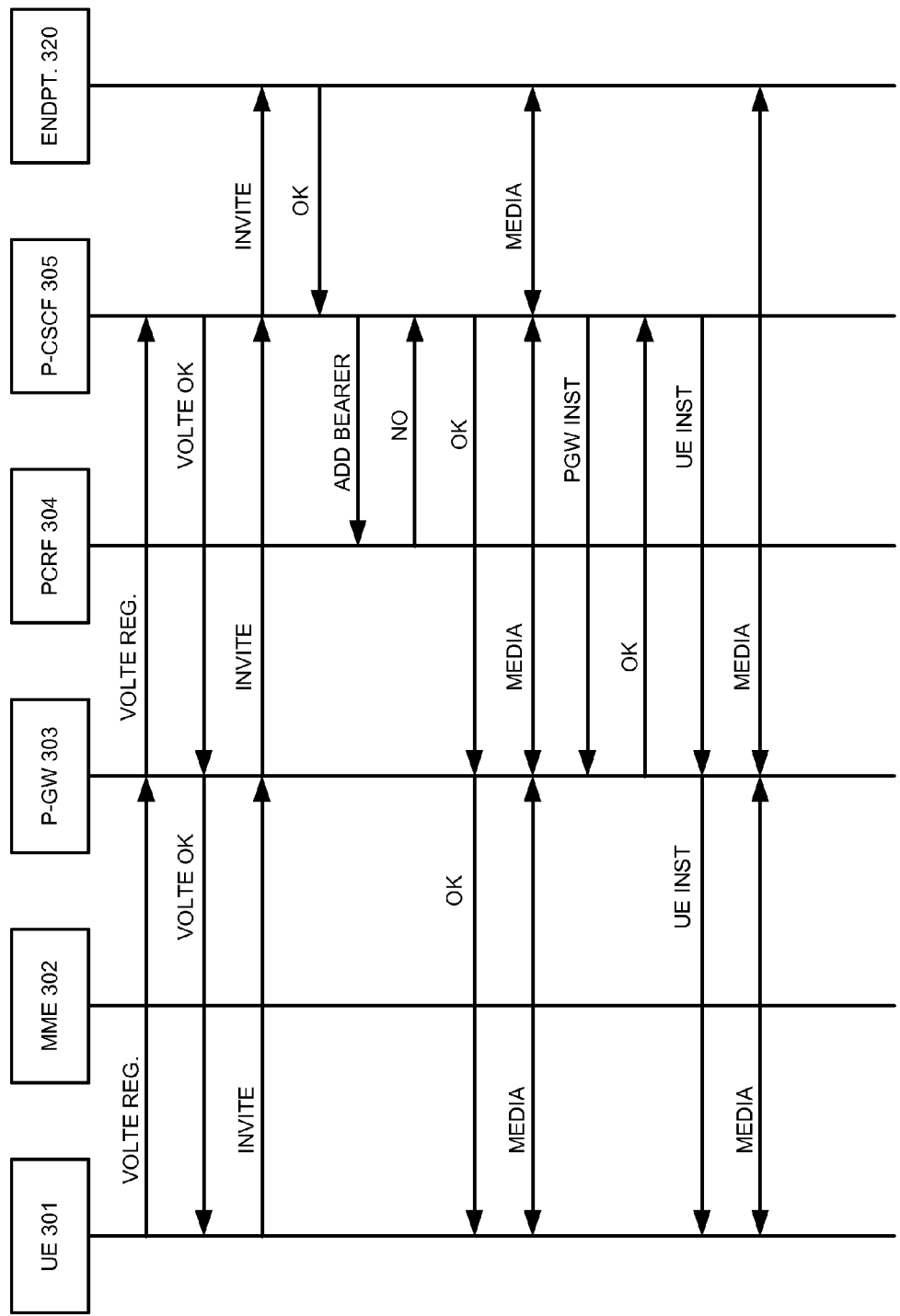
FIG. 6 illustrates the operation of a communication system to control an LTE media session with an IMS P-CSCF server.

FIG. 6 illustrates the operation of communication system 300 to control an LTE media session with IMS P-CSCF 305. In this example, default bearer 306 is already established. UE 301 transfers a VoLTE registration message to P-CSCF 305 over IMS bearer 306 through P-GW 303. P-CSCF 305 performs VoLTE registration for UE 301 and returns a registration acknowledgement to UE 301 over IMS bearer 306 through P-GW 303.

Post-registration, UE 301 transfers a SIP INVITE over IMS bearer 306 through P-GW 303 to P-CSCF 305 for a voice session with media endpoint 320. P-CSCF 305 processes the INVITE to transfer a corresponding SIP INVITE to media endpoint 320—typically through intermediate SIP systems. Media endpoint 320 accepts the media session with a SIP OK response to P-CSCF 305. In response to the session acceptance, P-CSCF 305 transfers a Diameter instruction to PCRF 304 to add a dedicated bearer for the media session.

In this example, PCRF system 304 returns a negative acknowledgement to the Diameter instruction. P-CSCF 305 processes the negative acknowledgement and determines to bypass PCRF 304. To initiate the bypass, P-CSCF 305 transfers a SIP OK message to UE 301 over IMS bearer 306 through P-GW 303. The SIP OK message is in response to the original INVITE from UE 301. The SIP OK message directs UE 301 to use IMS bearer 306 for the media session. In response, UE 301 transfers voice packets for the session in an IP wrapper that uses IMS bearer 306 through P-GW 303 to P-CSCF 305. P-CSCF 305 exchanges the voice packets with media endpoint 320 over link 318 (typically through other IMS components).

In this example, P-CSCF 305 also processes the negative acknowledgement to transfer a P-GW instruction to P-GW 303. The P-GW instruction directs P-GW 303 to establish a dedicated bearer for the media session, and may include QoS and bandwidth allocation information as if PCRF 304 had sent the instruction. P-CSCF 305 could store default values for these instructions. The P-GW instruction may comprise a Diameter Re-Authorization Request (RAR) message. In response to the P-GW instruction, P-GW 303 establishes the dedicated bearer (including possible messages to UE 301) and reports success back to P-CSCF 305.

In response to the dedicated bearer, P-CSCF 305 transfers a UE instruction to UE 301 over IMS bearer 306 through P-GW 303. The UE instruction, which could be a SIP message, directs UE 301 to use the new dedicated bearer for the media session. In response, UE 301 exchanges voice packets for the session with media endpoint 320 through P-GW 303—now avoiding P-CSCF 305.

Figure 7:
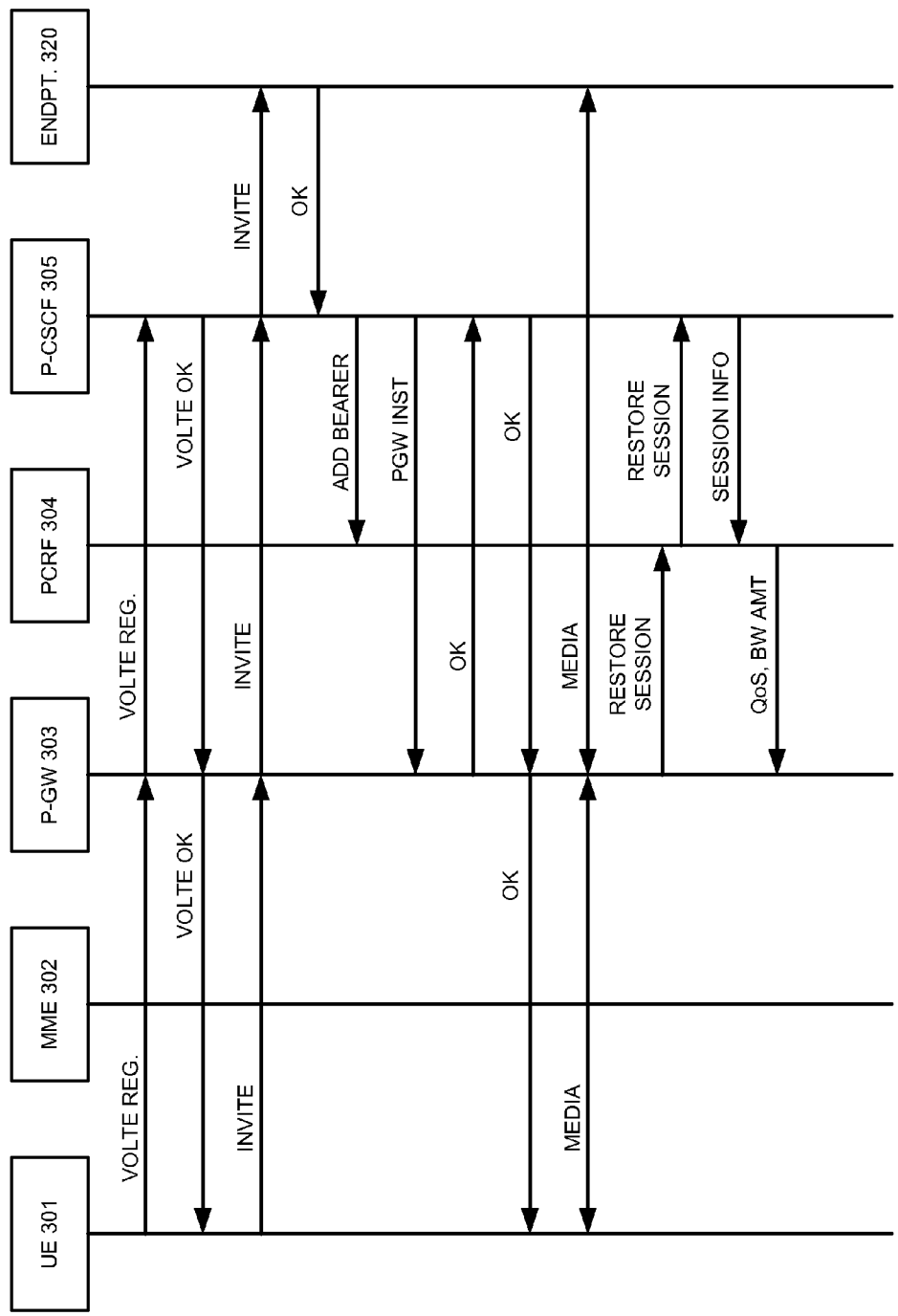
FIG. 7 illustrates the operation of a communication system to control an LTE media session with an IMS P-CSCF server.

FIG. 7 illustrates the operation of communication system 300 to control an LTE media session with IMS P-CSCF 305. In this example, default bearer 306 is already established. UE 301 transfers a VoLTE registration message to P-CSCF 305 over IMS bearer 306 through P-GW 303. P-CSCF 305 performs VoLTE registration for UE 301 and returns a registration acknowledgement to UE 301 over IMS bearer 306 through P-GW 303.

Post-registration, UE 301 transfers a SIP INVITE over IMS bearer 306 through P-GW 303 to P-CSCF 305 for a voice session with media endpoint 320. P-CSCF 305 processes the INVITE to transfer a corresponding SIP INVITE to media endpoint 320—typically through other SIP systems. Media endpoint 320 accepts the media session with a SIP OK response to P-CSCF 305. In response to the session acceptance, P-CSCF 305 transfers a Diameter instruction to PCRF 304 to add a dedicated bearer for the media session.

In this example, PCRF system 304 fails to return an acknowledgement to the Diameter instruction, and P-CSCF 305 determines to bypass PCRF 304. To initiate the bypass, P-CSCF 305 transfers a P-GW instruction to P-GW 303. The P-GW instruction directs P-GW 303 to establish a dedicated bearer for the media session, and may include QoS and bandwidth amount information as if PCRF 304 had sent the instruction. The P-GW instruction could be a Diameter RAR. P-CSCF 305 may store default values for these P-GW instructions to use during PCRF outages. In response, P-GW 303 establishes the dedicated bearer (including possible messages to UE 301) and reports success back to P-CSCF 305.

In response to the dedicated bearer, P-CSCF 305 transfers a SIP OK message to UE 301 over IMS bearer 306 through P-GW 303. The SIP OK message is in response to the original INVITE from UE 301. The SIP OK message directs UE 301 to use the dedicated bearer for the media session. In response, UE 301 exchanges voice packets for the session with media endpoint 320 through P-GW 303—avoiding P-CSCF 305.

Also in response to the P-GW instruction, P-GW 303 initiates a Diameter session with PCRF 104 to restore the existing media session in PCRF 304. In response, PCRF 304 initiates a Diameter session with P-CSCF 305 to obtain session information. PCRF 304 processes the session information from P-CSCF 305 to generate new QoS and bandwidth information. PCRF 304 transfers the new session information to P-GW 303 and re-asserts its control over QoS and billing for the media session.

Figure 8:
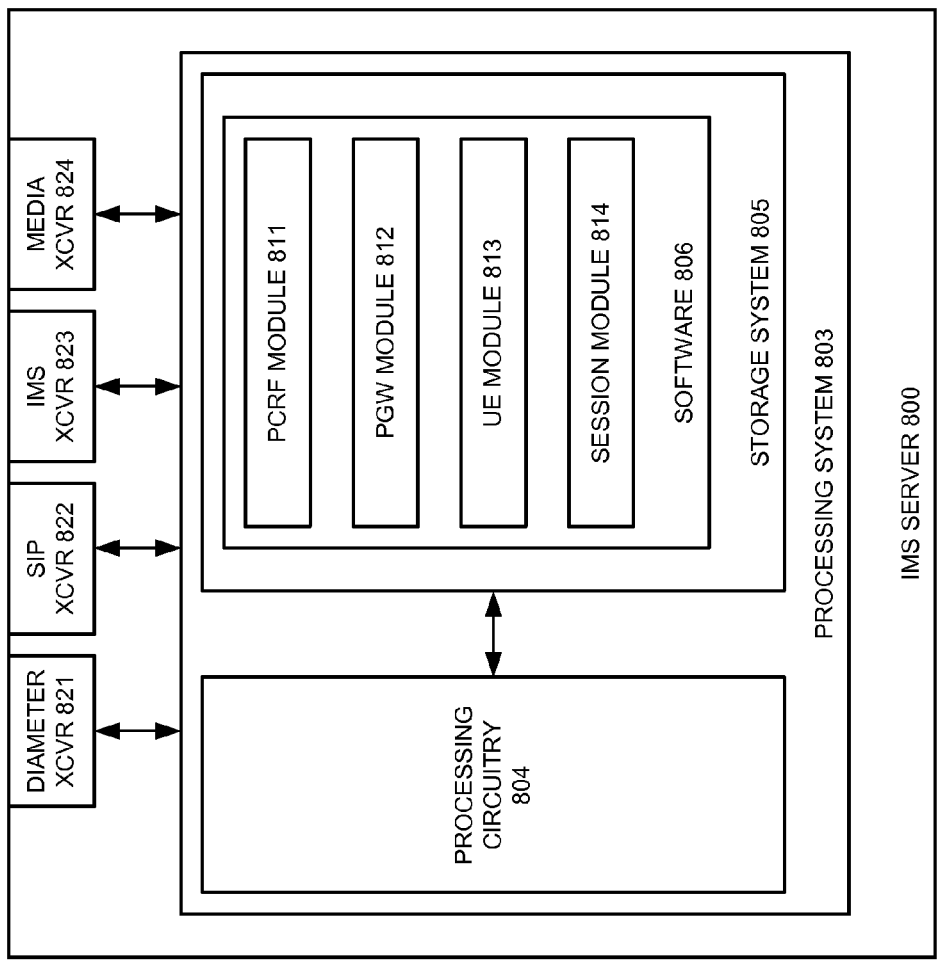
FIG. 8 illustrates an IMS server to control media sessions through an LTE P-GW.

FIG. 8 illustrates IMS server 800 to control media sessions through an LTE P-GW. IMS server 800 is an example of systems 105 and 305, although these systems may use alternative configurations and operations. IMS server 800 comprises processing system 803 and data communication transceivers 821-824. Processing system 803 comprises processing circuitry 804 and storage system 805. Storage system 805 stores software 806. Software 806 includes software modules 811-814. Some conventional aspects of IMS server 800 are omitted for clarity, such as power supplies, enclosures, and the like. IMS server 800 may be centralized or distributed and may include various virtualized components.

In processing system 803, processing circuitry 804 comprises circuit boards, integrated circuitry, and associated electronics. Storage system 805 comprises non-transitory, machine-readable, data storage media, such as flash drives, disc drives, memory circuitry, servers, and the like. Software 806 comprises machine-readable instructions that control the operation of processing circuitry 804 when executed. Software 806 includes modules 811-814 and may also include operating systems, applications, utilities, databases, and the like. All or portions of software 806 may be externally stored on one or more storage media, such as flash drives, discs, servers, and the like.

When executed by processing circuitry 804, PCRF module 811 directs circuitry 804 to exchange Diameter messages with PCRF systems and to detect message acknowledgement time-outs and negative acknowledgements. When executed by processing circuitry 804, P-GW module 812 directs circuitry 804 to exchange IP messages with P-GW systems. When executed by processing circuitry 804, UE module 813 directs circuitry 804 to exchange SIP messages with UEs. When executed by processing circuitry 804, session module 814 directs circuitry 804 to process SIP messaging to establish media sessions, including transferring messages to UEs, PCRFs, and P-GWs to implement PCRF bypass.

Communication transceivers 821-825 comprise communication components, such as ports, signal processing circuitry, memory, software, and the like. Diameter transceiver 821 exchanges Diameter messages with PCRF, P-GW, and other systems. SIP transceiver 822 exchanges SIP messages with UEs, CSCFs, and other systems—including media data encapsulated in SIP messaging by UEs. IMS transceiver 823 exchanges SIP messages and other data with other IMS systems, including other CSCF systems. Media transceiver 824 exchanges media data, such as voice and messaging packets, with UEs and other systems. Media transceiver 824 may also assist in handling media data encapsulated in SIP messaging.

Figure 9:
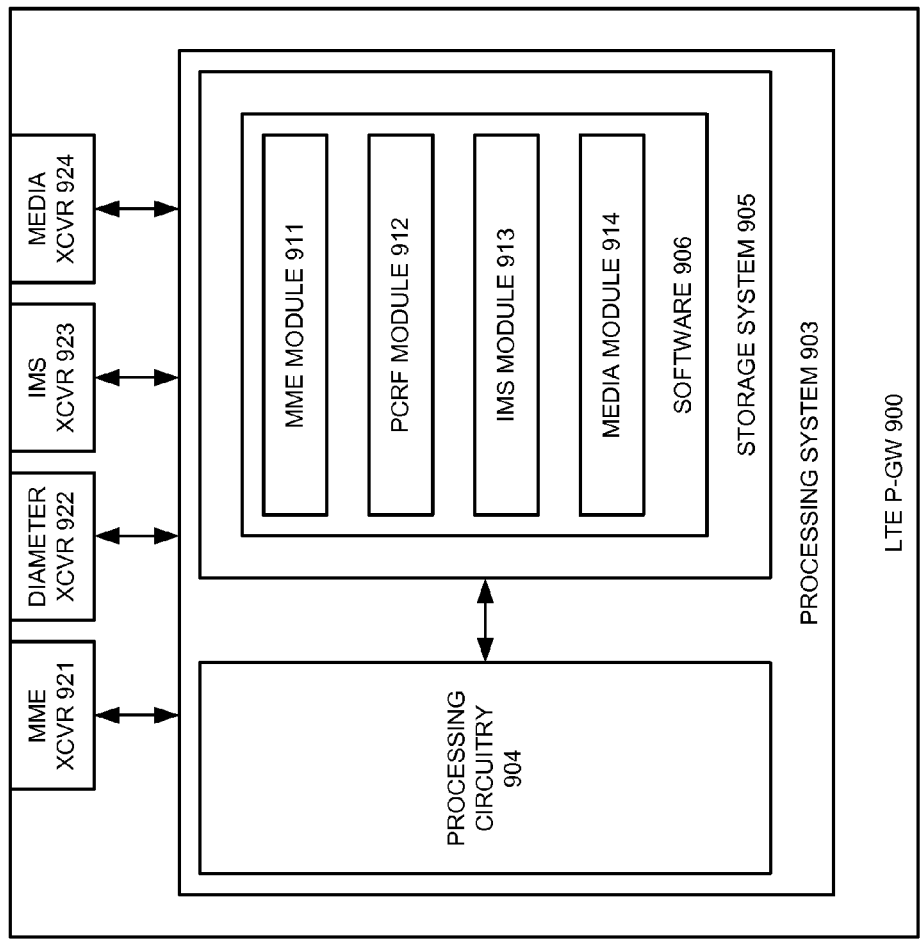
FIG. 9 illustrates an LTE P-GW to facilitate IMS control of media sessions.

FIG. 9 illustrates LTE P-GW 900 to facilitate IMS control of media sessions. LTE P-GW 900 is an example of systems 103 and 303, although these systems may use alternative configurations and operations. LTE P-GW 900 comprises processing system 903 and data communication transceivers 921-924. Processing system 903 comprises processing circuitry 904 and storage system 905. Storage system 905 stores software 906. Software 906 includes software modules 911-914. Some conventional aspects of LTE P-GW 900 are omitted for clarity, such as power supplies, enclosures, and the like. LTE P-GW 900 may be centralized or distributed and may include various virtualized components.

In processing system 903, processing circuitry 904 comprises circuit boards, integrated circuitry, and associated electronics. Storage system 905 comprises non-transitory, machine-readable, data storage media, such as flash drives, disc drives, memory circuitry, servers, and the like. Software 906 comprises machine-readable instructions that control the operation of processing circuitry 904 when executed. Software 906 includes modules 911-914 and may also include operating systems, applications, utilities, databases, and the like. All or portions of software 906 may be externally stored on one or more storage media, such as flash drives, discs, servers, and the like.

When executed by processing circuitry 904, MME module 911 directs circuitry 904 to exchange messages with MME systems (through S-GWs) to establish bearers. When executed by processing circuitry 904, PCRF module 912 directs circuitry 904 to exchange Diameter messages with PCRF systems to establish bearers and to enforce QoS and bandwidth allocations. When executed by processing circuitry 904, IMS module 913 directs circuitry 904 to exchange IP messages between UEs and IMS servers, including receiving messages from IMS servers to implement PCRF bypass. When executed by processing circuitry 904, media module 914 directs circuitry 904 to process IP packets for media sessions.

Communication transceivers 921-925 comprise communication components, such as ports, signal processing circuitry, memory, software, and the like. MME transceiver 921 exchanges LTE messages with MME systems (through S-GWs) to establish bearers. Diameter transceiver 922 exchanges Diameter messages with PCRFs and other systems to establish and maintain bearers—including PCRF bypass instructions from IMS servers. IMS transceiver 923 exchanges IP messages between UEs and IMS servers, including P-CSCFs. Media transceiver 924 exchanges media data, such as voice and messaging packets, with UEs and other systems.

Figure 10:
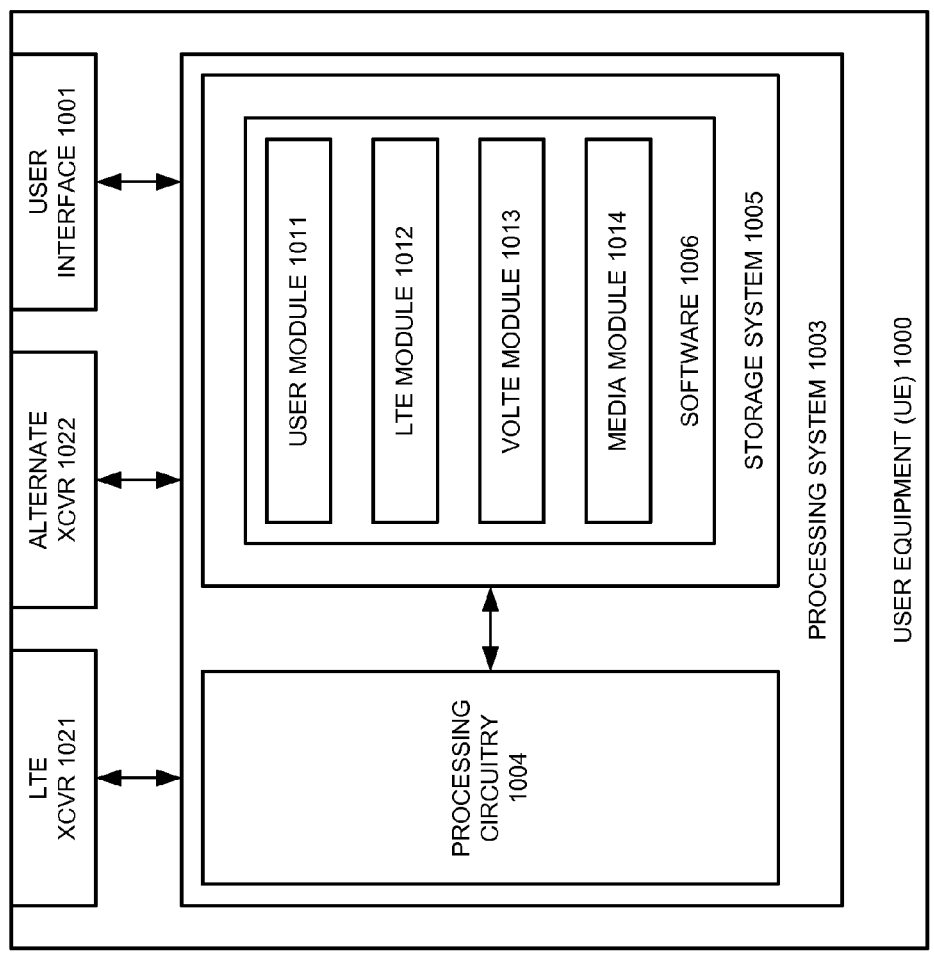
FIG. 10 illustrates User Equipment (UE) to implement IMS control of media sessions through an LTE P-GW.

FIG. 10 illustrates User Equipment (UE) 1000 to implement IMS control of media sessions through an LTE P-GW. UE 1000 is an example of UEs 101 and 301, although these systems may use alternative configurations and operations. UE 1000 comprises user interface 1001, processing system 1003, and data communication transceivers 1021-1022. Processing system 1003 comprises processing circuitry 1004 and storage system 1005. Storage system 1005 stores software 1006. Software 1006 includes software modules 1011-1014. Some conventional aspects of UE 1000 are omitted for clarity, such as power supplies, enclosures, and the like. UE 1000 may be centralized or distributed and may include various virtualized components.

User interface 1001 comprises displays, touch sensors, speakers, microphones, and the like. User interface 1001 receives user inputs to initiate and accept media sessions. User interface 1001 presents media for the media sessions.

In processing system 1003, processing circuitry 1004 comprises circuit boards, integrated circuitry, and associated electronics. Storage system 1005 comprises non-transitory, machine-readable, data storage media, such as flash drives, disc drives, memory circuitry, servers, and the like. Software 1006 comprises machine-readable instructions that control the operation of processing circuitry 1004 when executed. Software 1006 includes modules 1011-1014 and may also include operating systems, applications, utilities, databases, and the like. All or portions of software 1006 may be externally stored on one or more storage media, such as flash drives, discs, servers, and the like.

When executed by processing circuitry 1004, user module 1011 directs circuitry 1004 to interact with the user and present media through user interface 1001. When executed by processing circuitry 1004, LTE module 1012 directs circuitry 1004 to register and communicate with LTE systems, possibly through non-LTE access points. When executed by processing circuitry 1004, VoLTE module 1013 directs circuitry 1004 to interact with an IMS server to implement VoLTE sessions, including handling instructions to use the IMS bearer for voice packets. Media module 1014 directs circuitry 1004 to exchange media data over LTE and other systems.

Communication transceivers 1021-1022 comprise communication components, such as antennas, filters, amplifiers, signal processing circuitry, memory, software, and the like. LTE transceiver 1021 exchanges wireless LTE signals with LTE base stations, relays, and other equipment. Alternate transceiver 1022 exchanges signals with LTE access gateways through alternate access points, such as WiFi hotspots, 2G/3G base stations, and internet access connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system to control a Long Term Evolution (LTE) media session with an Internet Multimedia Subsystem (IMS), the method comprising:

in an LTE Packet Gateway (P-GW), establishing an IMS bearer between User Equipment (UE) and an IMS server;

in the IMS server, receiving a media session request over the IMS bearer and processing the media session request to establish the media session including transferring a media session instruction for delivery to an LTE Policy, Charging, and Rules Function (PCRF) system;

in the IMS server, detecting a PCRF bypass condition for the media session, and in response, transferring a UE session instruction for delivery to the UE to use the IMS bearer for the media session;

in the LTE P-GW, exchanging media data for the media session over the IMS bearer; and in the IMS server, exchanging the media data for the media session over the IMS bearer.

2. The method of claim 1 further comprising, in the IMS server, exchanging the media data for the media session over a voice communication link.

3. The method of claim 1 further comprising, in the IMS server, exchanging the media data for the media session over an emergency communication link.

4. The method of claim 1 wherein detecting the PCRF bypass condition comprises detecting a time-out for a PCRF acknowledgement for the media session instruction.

5. The method of claim 1 wherein detecting the PCRF bypass condition comprises detecting a bypass indication signal from the PCRF system.

6. The method of claim 1 wherein the media session request comprises an emergency session request and wherein detecting the PCRF bypass condition comprises identifying that the media session request comprises the emergency session request.

7. The method of claim 1 wherein the media session request comprises a Voice over Long Term Evolution (VoLTE) session request and wherein detecting the PCRF bypass condition comprises identifying that the media session request comprises the VoLTE session request.

8. The method of claim 1 further comprising:
in the IMS server in response to detecting the PCRF bypass condition, transferring a P-GW session instruction for delivery to the LTE P-GW including Quality-of-Service (QoS) information and bandwidth allocation information for a dedicated bearer for the media session;
in the LTE P-GW, receiving and processing the P-GW session instruction to establish the dedicated bearer for the media session.

9. The method of claim 8 further comprising:
in the IMS server, transferring another UE session instruction for delivery to the UE to use the dedicated bearer for the media session; and
in the LTE P-GW, exchanging media data for the media session over the dedicated bearer.

10. The method of claim 8 wherein the P-GW session instruction comprises a Diameter Re-Authorization Request (RAR) message.

11. A communication system to control a Long Term Evolution (LTE) media session with an Internet Multimedia Subsystem (IMS), the communication system comprising:
an LTE Packet Gateway (P-GW) configured to establish an IMS bearer between User Equipment (UE) and an IMS server;
the IMS server configured to receive a media session request over the IMS bearer and process the media session request to establish the media session including transferring a media session instruction for delivery to an LTE Policy, Charging, and Rules Function (PCRF) system;
the IMS server configured to detect a PCRF bypass condition for the media session, and in response, transfer a UE session instruction for delivery to the UE to use the IMS bearer for the media session; and
the LTE P-GW configured to exchange media data for the media session over the IMS bearer; and
the IMS server configured to exchange the media data for the media session over the IMS bearer.

12. The communication system of claim 11 wherein the IMS server is configured to exchange the media data for the media session over a voice communication link.

13. The communication system of claim 11 wherein the IMS server is configured to exchange the media data for the media session over an emergency communication link.

14. The communication system of claim 11 wherein the PCRF bypass condition comprises a time-out for a PCRF acknowledgement for the media session instruction.

15. The communication system of claim 11 wherein the PCRF bypass condition comprises a bypass indication signal from the PCRF system.

16. The communication system of claim 11 wherein the media session request comprises an emergency session request and wherein the IMS server is configured to detect the PCRF bypass condition by identifying that the media session request comprises the emergency session request.

17. The communication system of claim 11 wherein the media session request comprises a Voice over Long Term Evolution (VoLTE) session request and wherein the IMS server is configured to detect the PCRF bypass condition by identifying that the media session request comprises the VoLTE session request.

18. The communication system of claim 11 further comprising:
the IMS server is configured, in response to detecting the PCRF bypass condition, to transfer a P-GW session instruction for delivery to the LTE P-GW including Quality-of-Service (QoS) information and bandwidth allocation information for a dedicated bearer for the media session;
the LTE P-GW is configured to receive and process the P-GW session instruction to establish the dedicated bearer for the media session.

19. The communication system of claim 18 wherein:
the IMS server is configured to transfer another UE session instruction for delivery to the UE to use the dedicated bearer for the media session; and
the LTE P-GW is configured to exchange media data for the media session over the dedicated bearer.

20. The communication system of claim 18 wherein the P-GW session instruction comprises a Diameter Re-Authorization Request (RAR) message.

* * * * *